Figure 1:
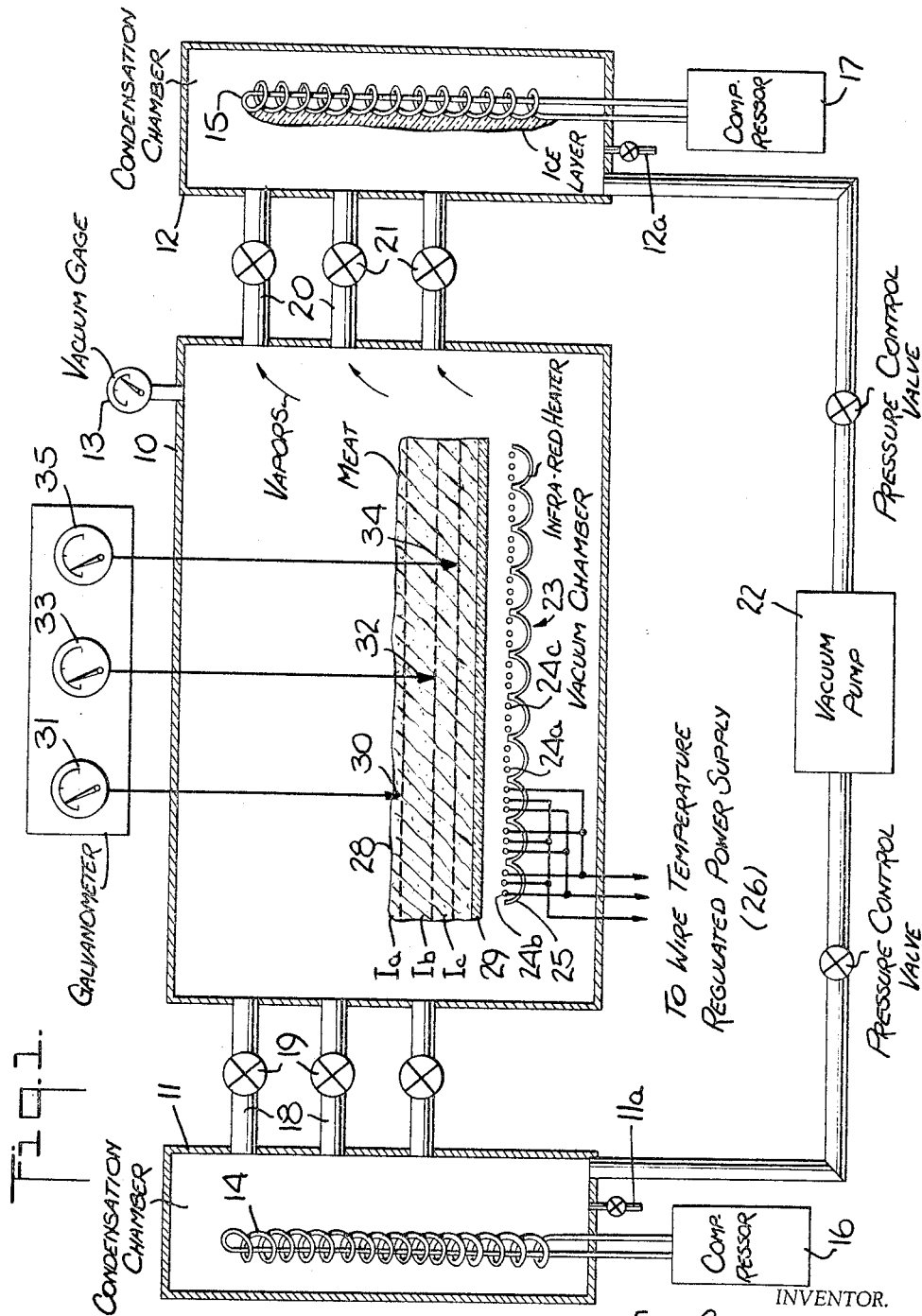

INVENTOR.
Franz Oppenheimer, Deceased
BY Suzzane Bohnen Oppenheimer, Executrix
ATTORNEY

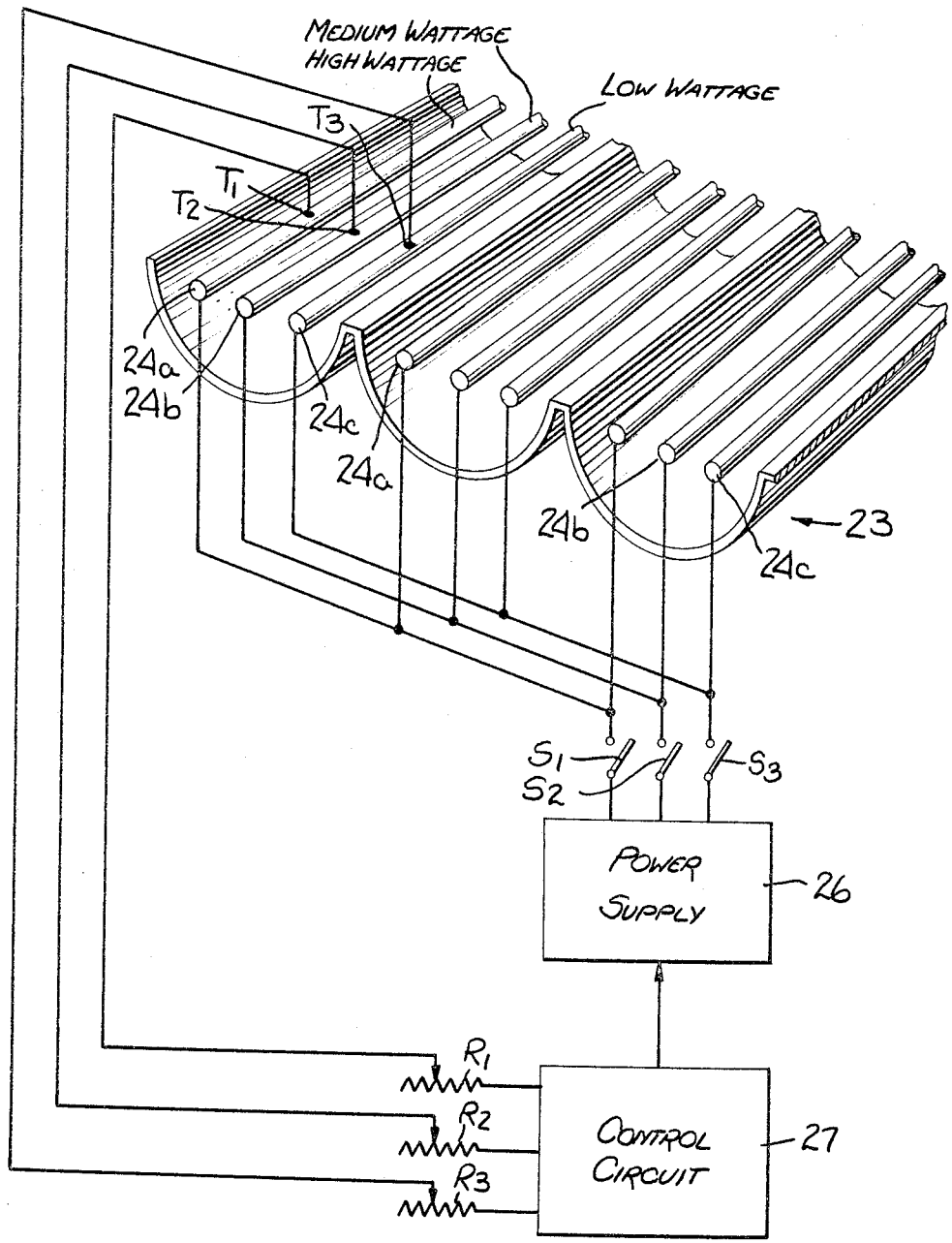

3,271,874
INFRA-RED SUBLIMATION METHOD AND APPARATUS FOR FREEZE DRYING TECHNIQUES
Franz Oppenheimer, deceased, late of Chicago, Ill., by Suzanne Bohnen Oppenheimer, executrix, 900 N. Michigan Ave., Chicago, Ill. 60611
Filed Jan. 28, 1965, Ser. No. 428,879
3 Claims. (Cl. 34—5)

This invention relates generally to freeze drying techniques, and more particularly to a method and apparatus for freeze drying meats and other products wherein the water of composition of the frozen product is removed by sublimation through the use of infra-red energy radiated in a spectral region selected for optimum results. This invention constitutes an improvement over the invention disclosed in my co-pending application, Serial No. 199,341, filed June 1, 1962, now U.S. Patent No. 3,233,333.

It is known to dehydrate food and other materials by the freeze drying process wherein the material in first frozen and the water om composition is then removed by sublimation whereby the solidified water is converted to vapor without passing through a melting phase. Sublimation is normally carried out in a high vacuum, drying being promoted by supplying the latent heat of sublimation from an appropriate heat source.

In freeze drying, the components of the food product are locked together in the frozen state so that physical changes and chemical reactions are inhibited, thereby minimizing the loss of volatile components. This process overcomes many of the drawbacks of conventional drying methods, for shrinkage of the material and migration of dissolved constituents are eliminated by maintaining the material in the frozen state until it is dry.

Products which are properly freeze-dried are highly porous and are quickly reconstituted by adding water, the reconsistituted product being almost identical to the fresh material both as to appearance and palatability. Such products can be kept safety for protracted periods in storage at room temperature in the absence of moisture and oxygen, i.e., in an inert atmosphere within a hermetically sealed container.

In freeze-drying, two basic freezing methods are in use; namely, prefreezing and evaporation freezing. In prefreezing, the material is first frozen by refrigeration equipment before being placed in a vacuum chamber for sublimation, whereas in evaporation-freezing the material is placed in the unfrozen state in the chamber, and freezing is carried out by the cooling action which accompanies evaporation.

The three main types of heating used in freeze-drying are conduction, dielectric and radiant heating, and these will now be separately discussed.

In conduction heating, the latent heat of sublimation is applied by direct heat transfer from heated plates or shelves on which the material to be treated is placed. During dessication, the frozen material is progressively dehydrated from its surface to its center. The ice phase boundary at which sublimation occurs thus recedes from the heated surfaces.

In conduction heating, dehydration becomes progressively slower during dessication because of the low thermal conductivity of the dessicated layer separating the ice phase boundary from the heating plates during the latter stages of drying. Dessicated meat has a low thermal conductivity which is as little as 1% of the same meat when in the frozen state. Hence the surface may become overheated and scorched during desiccation of the center. Also in drying irregularly shaped pieces, such as chicken parts, contact with the plate is poor and the rate of heat transfer is consequently reduced.

In dielectric heating, the food is placed between electrodes and subjected to a high-frequency electric field. The food acts as a dielectric radio-frequency energy being absorbed by the frozen material. Such heating has not proved to be commercially feasible, for causes ionization and spark discharges in the residual gas in the vacuum chamber and has the effect of burninng or scorching the food. However, if the voltage is decreased to avoid ionization, the rate of heating becomes so low as to nullify whatever advantage dielectric heating has over other methods. Moreover, food is not characterized by a uniform and homogeneous dielectric constant, hence dielectric heating produces highly irregular results and is difficult to control.

In radiant heating, infra-red coils or heater elements are ordinarily used as the primary heat source. Radiant heat has the advantage of distributing the heat uniformly over the surface of the food without requiring contact therewith. However, most solid food products are relatively opaque to infra-red radiation, and as drying normally takes place from all surfaces of the product laid on a tray, it is difficult to maintain the optimum rate of heat input necessary to penetrate the food without at the same time burning the dry surface. Only in the initial stages of drying does sublimation take place from a frozen surface. As soon as the ice boundary recedes below the outer surface, thermal resistance is presented by the outer porous layers. If the heat is applied at a slow enough rate to avoid damage to the dried material, the process is slowed up to a point where it will take as much as twenty-four hours to dry a beef steak of average size.

In view of the foregoing, it is the primary object of the present invention to provide an improved and commerically feasible technique and apparatus for freeze-drying food and other materials, wherein the latent heat of evaporation is supplied by an infra-red source whose radiation is maintained throughout the sublimation process in a spectral region which, with respect to the food being dried produces optimum results and maximizes the amount of water removed for each watt of applied energy.

Visible energy lies in the spectral range of 3900 to 7700 Angstrom units, this range being the one to which the visual sense of human beings is sensitive. Short-wave, infra-red energy lies in the range of 7700 to 14,000 Angstrom units, and while organic tissue is relatively opaque to visible energy, it is penetrable by infra-red radiation. Physical measurements indicate that bodily tissue is chiefly transparent to radiant energy between 6000 and 14,000 Angstrom units, with maximum penetration occurring around 11,000 Angstrom units. Less penetration is obtained in the long-wave infra-red region above 14,000 Angstrom units.

The effectiveness of radiant heating in sublimation depends on the spectral distribution of the energy emitted by the infra-red element with reference to the character of the frozen product being irradiated. It is known, for example, that the percentage of total energy emitted within a particular portion or band in the spectral region is different for a tungsten element than for a carbon element, and that the relative distribution of energy for either element varies with its temperature. But whether infra-red energy concentrated in a particular band will penetrate to a greater or lesser extent depends on the physical properties of the frozen product and is different, for example, for shrimp which is whitish in color, and for frozen steak, which is reddish in color.

For a given heater, such as the high-voltage, black body resistance element disclosed in my co-pending application, the percentage of total energy radiated within a given band in the spectral region will shift as the temperature of these bodies is raised or lowered. Hence when decreasing the wattage of the heater in the usual way, as by lowering the voltage applied thereto, the surface temperature will at the same time be reduced, so that not only will the total amount of radiated infrared energy be reduced, but its spectral distribution will also be altered.

Accordingly, it is a more specific object of this invention to provide a sublimation method wherein the optimum heater temperature is determined to effect the greatest degree of penetration of the frozen product being irradiated, which temperature is maintained constant to optimize the sublimation process, even as the wattage of the heater operation is reduced.

Briefly stated, these objects are attained in an infra-red heater structure having heater elements which may be operated at different wattage levels, the temperature of the heater element being measured to control the power system for the heaters so as to maintain a desired temperature value regardless of the wattage level to which the system is adjusted.

For a better understanding of the invention as well as other objects and further features thereof, reference is made to the following detailed description to be read in conjunction with the accompanying drawing, wherein:

FIG. 1 is a schematic diagram of a freeze-dry apparatus in accordance with the invention; and FIG. 2 is a separate showing of the infra-red heater unit included in the apparatus to effect sublimation.

*General description of process*

We shall first consider in general terms the succession of steps which constitutes a freeze-drying process in accordance with the invention. The invention is of particular advantage in connection with freeze-drying of commodities having cellular structures, including such meats as beef, lamb, pork and chicken, and such fish as shrimp, crabmeat, lobster and scallop.

The material to be dried must be held under vacuum in a chamber during the drying process. The absolute pressure required will depend on the physical characteristics of the material and on the temperatures at which the frozen material must be held. Two types of equipment may be used for freeze-drying, namely; mechanical vacuum pumps and steam jet ejectors. The vapor formed by sublimation can be pumped out directly or can be removed ahead of the pump by a condenser.

The first step in the process, which is called pre-cooling, is concerned with the condition of the food product before it is placed in the vacuum chamber. In order to obtain effective results it is desirable that the food before freeze-drying be maintained in a humid or super-saturated atmosphere to prevent loss of moisture. The food should be refrigerated to a point close to freezing evenly throughout, i.e., the food before insertion in the vacuum chamber should be in a temperature range of $+1°$ C. to $+4°$ C., and preferably at about $2°$ C.

In the second step, called de-gasification, the cold and humid food is placed in a vacuum chamber, and the pressure therein is reduced in a succession of steps which serves to cause removal of gases from the internal structure of the food including oxygen from the cells and some moisture, but without substantially lowering the temperature of the food. This step, which is carried out within a relatively brief period, say a half-hour, serves to prepare the food for freezing. De-gasification must be carried out in a series of progressive steps in order to prevent an excessive rate of de-gasification which might result in gas explosions with disruptive results.

The second step has a two-fold purpose. First, it partially evacuates the capillaries and cells of the food so that upon subsequent freezing the ice crystals occupy the evacuated space, thereby minimizing internal explosions which burst the capillary walls and cell membranes. Second, the removal of gases produces a bubble-free or gas-free ice block having relatively high thermal conductivity as compared to a gas-containing ice block, thereby accelerating sublimation when heat is applied thereto.

In the third step, called evaporation freezing, a full vacuum is drawn in the chamber, and the de-gassed food is frozen solid by evaporative cooling, an ice pack being formed which extends throughout the body of the food and is contiguous with the faces or surfaces thereof.

In the fourth and final step, called sublimation, radiant heat is applied to one surface of the food, the food having been initially placed on and pressed against a platen which is effectively transparent to infra-red radiation in such a manner as to seal the contacting pores thereof. In this way the infra-red rays impinge on the surface of the ice pack, engaging the platen, and are conducted by the pack throughout the food product. Sublimation can then occur only from the free surface of the food. Thus the ice phase recedes not from the platen-contacting surface exposed to the rays, but from the free surface, and water vapor passes out through a porous layer of the material in order to escape into the vacuum chamber.

The ice boundary therefore moves inwardly and unidirectionally from the free surface to the contacting surface until the food is entirely dessicated. Thus until the ice at the very bottom boundary is sublimated, the food is not completely dried and the vapors passing through the fibers prevent cooking thereof.

*Description of freeze-drying apparatus*

Referring now to FIG. 1, the apparatus for carrying on the process is illustrated, the apparatus comprising a vacuum chamber 10 having a door or cover for admitting food, and a pair of condensation chambers 11 and 12 communicating therewith, on either side of the chamber. The pressure within the chamber is measured by a suitable gauge 13, such as the McLeod type, and leak-detector means may also be provided.

The condensation chambers each contain a freezing coil 14 and 15 for removing sublimated vapors from the chamber, the coils being connected to conventional compressors 16 and 17, respectively, adapted to pump a boiling refrigeration fluid therethrough, such as freon or propane. In order to maintain the coils at a uniform temperature, the coils may be connected to the compressors through a suitable manifold. The condensation chamber 11 is coupled to the vacuum chamber through large ducts 18 provided with valves 19, and chamber 12 is similarly coupled to the vacuum chamber through ducts 20 having valves 21 therein.

The condensation chambers are arranged so that all vapor must flow past it in order to reach the vacuum pump 22. As drying proceeds, a layer of ice is built up on the condenser coils. The condensation area of the condenser should therefore be large enough so that the ice thickness is not excessive. Upon completion of a run, the condenser coils may be defrosted by steam, hot water, or other conventional means, and the fluid run out through valved outlets 11a and 12a. If the operation is continuous, rotary condensers may be used to remove the ice by means of rotating scraping blades.

The food 28 to be dried is supported directly above the heating unit 23 on the flat, non-porous platen 29 which is effectively permeable to infra-red energy and is not heated thereby. A glass plate such as Corning No. 7280 may be used for this purpose, but preferably the material is a solid plastic sheet which is effectively transparent to infra-red radiation in the selected region, such as one constituted by polymerized propylene material or a heat-resistant synthetic having similar structural and optical properties. The food-supporting members should have minimum heat capacity so that there is no greater evaporation of water in the liquid state than is necessary to freeze the material.

The temperature of the food within the chamber is sensed by three thermocouple probes. Preferably the probes are constituted by very thin-gauge wires (i.e, 25–50 microns in diameter) enclosed in hypodermic needle tubing, in order to minimize heat conduction and thereby obtain true readings. Thermistors may be used for the same purpose. Probe 30 tests the temperature on the top surface of the food, and is coupled to a galvanometer 31 or other indicating or recording means. Probe 32 penetrates the food at the half depth point, and is coupled to galvanometer 33, while probe 34 lies half-way between probe 32 and the bottom surface, and is coupled to galvanometer 35. Thus the thermocouples effectively afford readings of the temperature throughout the body of the food.

By way of example, we shall consider the freeze-drying of steak. The steak is kept in a humid condition in a refrigerator, and before being placed in the chamber, it is at a temperature in the range of +1° C. to +4° C., preferably at 2° C. After taking the steak out of the pre-cooler, it is pressed firmly down on platen 29 to seal off all of its under-surface pores. Hence the vapors can emanate only from the free surfaces of the steaks.

With the pre-cooled steaks in the vacuum chamber, we start to pull a vacuum for a period, say, of 5 to 10 minutes, at which the pressure is about 10 millimeters. The temperature of the steak, as indicated by the three thermocouples inserted in one of them, will not change significantly at this point.

Then the pressure is further reduced to, say, 5 millimeters, and held at this level for about 10 to 15 minutes, during which gases and some liquid in the steaks are withdrawn. The temperature, as indicated by the thermocouples will still read about 2° C. All readings mentioned herein are in degrees Centigrade.

Now that the steaks have been de-gassed, the pressure is further reduced to 3 millimeters, and the temperature drops to about −2° (thermocouple 31), −2° (thermocouple 33), and −2° (thermocouple 35), and then proceeds to move downward. At this point the meat is frozen and full vacuum is slowly applied (less than 200 microns) and in about 10 minutes the temperatures are now down to about −28°, depending on the final vacuum and the water vapor pressure controlled by the temperature of the cooling coils.

The heater unit 23 is then activated to supply the latent heat of sublimation. As pointed out previously, vaporation from the under-surface is blocked by the platen 29, hence the vapors are emitted from the free surfaces of the food, and the ice boundary represented by dash-lines Ia, Ib and Ic, recedes progressively from the top surface, the vapors passing through the dried pores of the food and into the vacuum chamber and from there to the condenser 11 where they form ice on the coils. When condenser 11 reaches its ice capacity, the valves thereof are closed, and the valves of condenser 12 opened to put this condenser into operation.

In practice, during sublimation, the temperature of the thermocouples will remain at about −20° C. for 3 to 4 hours and the surface temperature will then rise to about −18° C., then −15° C., and at the end of 6 hours it will reach 0° C. When the bottom thermocouple reaches about +15° C., the wattage of the heater is cut down stepwise until no further rise in temperature occurs. In the drying cycle, the temperature, as indicated by the surface probe, should not be permitted to rise above 15° C.

In carrying out the process on a mass production basis, a series of heaters may be stacked one above the other, the reflectors being water-cooled so that the radiant energy is upwardly directed to sublimate the food on the platen thereabove and to avoid cooking of the food therebelow.

*Sublimation heaters*

Referring now to FIG. 2, there is shown in greater detail the heater unit 23, and it will be seen that the unit is constituted by an array of identical wire-like heating element sets, each set being composed of three elements 24a, 24b and 24c, each set lying at the focal point of an individual parabolic reflector. The heater elements are preferably of the high-voltage type, each having a different wattage range, element 24a being of relatively high wattage, element 24b being of medium wattage, and element 24c being of low wattage. The elements are black bodies, which when electrically energized are caused to glow between about 150° C. and 1500° C. to emit infrared energy whose percentage distribution through the spectral region depends on the operating temperature.

The high-wattage elements 24a are connected together through a switch $S_1$ to a power supply 26, the medium-wattage elements being connected thereto through a switch $S_2$, and the low-wattage elements through a switch $S_3$. Attached to the surface of the elements in one set are thermocouples $T_1$, $T_2$, and $T_3$, respectively, which in turn are coupled to an automatic control circuit 27 which regulates the voltage of power supply 26.

Each thermocouple measures the temperature of its associated element to produce a control voltage whose value is adjustable by means of a variable resistor, resistors $R_1$, $R_2$ and $R_3$ being provided for the three thermocouples. The control circuit, which may be in the form of an electronic reactor, acts to regulate the voltage applied to the heater elements which are operative to maintain the temperature level at a desired constant level. It will be appreciated that the ambient temperature conditions within the chamber and surrounding the operative elements vary in the course of sublimation, hence regulation is necessary to maintain the desired temperature.

is a particular band within the spectral region which provides optimum conditions of heat penetration and As noted previously, for any given food product there absorption to promote rapid sublimation without scorching of the food. The highest percentage of the total emitted energy emitted by the operative elements is a function of the temperature of these elements. For example, in the case of beefsteak, it has been found that the optimum condition is created when the heater surface temperature is at about 200° C., but for other foods different temperature values are indicated.

Having determined what the optimum infra-red heater body temperature is for a given food product to generate the most effective radiation, it becomes important to maintain this temperature despite changes in the wattage of the heater unit. This is carried out by the circuit shown in FIG. 2, which is arranged to provide the same heater-element temperature regardless of which wattage is made operative by switches $S_1$, $S_2$ and $S_3$. Hence it becomes possible to hold the radiated spectral region at its assigned distributive value, while the total amount of infra-red energy radiated is varied in accordance with the requirements of sublimation. Similar results may be accomplished in single-element systems, in which the elements are tapped at different points to afford different wattage ratings.

While there have been shown preferred method and apparatus for freeze drying techniques in accordance with the invention, it will be appreciated that many changes and modifications may be made therein without, however, departing from the essential spirit of the invention as defined in the annexed claims.

What is claimed is:

1. The method of freeze-drying water-laden food within a vacuum chamber provided with an electrically-operated radiating device adapted to direct infra-red energy onto said food, said method comprising the steps of:
   (a) reducing pressure in said chamber to effect evaporative cooling of said food to freeze same,
   (b) supplying electrical power to the radiating device to produce infra-red energy to sublimate the water of composition of the frozen food, the surface temperature of said device determining the band in the spectral region in which said energy is primarily radiated, (c) varying the amount of power supplied to said device in the course of sublimation in accordance with the temperature of said food, and (d) adjusting the radiating device to maintain the surface temperature thereof at a substantially constant level regardless of the amount of power supplied thereto in the course of sublimation, said level being such as to give rise to radiation in a band within said spectral region which provides optimum conditions of heat penetration and absorption to promote rapid sublimation without scorching of the food.

2. Apparatus for freeze-drying food having a water of composition, said apparatus comprising:

(a) a vacuum chamber, (b) means to support food within said chamber, (c) a radiating device within said chamber to produce infra-red energy which is directed onto said food, (d) pump means to reduce the pressure on said chamber to effect evaporative cooling of said food to freeze same, (e) means supplying electrical power to said radiating device to generate infra-red energy to sublimate the water of composition of said food, the surface temperature of said device determining the band in the spectral region in which said energy is primarily radiated, (f) means to measure the temperature of the food in the course of sublimation, (g) means to vary the amount of power supplied to said radiating device in the course of sublimation in accordance with the measured temperature of said food, (h) means to measure the surface temperature of said radiating device, and (i) means responsive to said surface temperature measurement to adjust the radiating device to maintain a substantially constant surface temperature at a predetermined level regardless of the amount of power supplied thereto in the course of sublimation, said level being such as to give rise to radiation in a band within said spectral region which provides optimum conditions of heat penetration and absorption to promote rapid sublimation without scorching of the food.

3. Apparatus as set forth in claim 2, wherein said radiating device is constituted by an array of units, each unit being composed of elements of different wattage, and wherein said means to vary the amount of power supplied to said device includes means selectively to energize elements of corresponding wattage in said units.

References Cited by the Examiner

UNITED STATES PATENTS

| | | | |
|---|---|---|---|
| 2,400,748 | 5/1946 | Flosdorf | 34—5 |
| 2,435,503 | 2/1948 | Levinson | 34—5 |
| 2,658,984 | 11/1953 | Mohn | 219—354 |
| 2,668,364 | 2/1954 | Colton | 34—5 |
| 2,724,040 | 11/1955 | Mouzon | 219—494 |
| 2,751,687 | 9/1956 | Colton | 34—5 |
| 2,907,117 | 10/1959 | Parkinson | 34—5 |
| 3,020,645 | 2/1962 | Copson | 34—5 |
| 3,059,086 | 10/1962 | Pedersen | 219—343 |
| 3,077,036 | 2/1963 | Neumann | 34—5 |
| 3,135,589 | 6/1964 | Stokes | 34—5 |
| 3,169,049 | 2/1965 | Rey | 34—5 |
| 3,178,829 | 4/1965 | Cox | 34—5 |
| 3,192,643 | 7/1965 | Rieutord | 34—5 |

WILLIAM J. WYE, *Primary Examiner.*